United States Patent [19]

Kawaguchi

[11] Patent Number: 4,667,887
[45] Date of Patent: May 26, 1987

[54] SAND PRODUCING METHOD AND APPARATUS

[75] Inventor: Mitsuru Kawaguchi, Kure, Japan

[73] Assignee: Kotobuki Engineering & Manufacturing Co., Ltd., Tokyo, Japan

[21] Appl. No.: 777,757

[22] Filed: Sep. 19, 1985

[30] Foreign Application Priority Data

Nov. 17, 1984 [JP] Japan ................. 59-242643

[51] Int. Cl.4 ............................. B02C 25/00
[52] U.S. Cl. ....................... 241/24; 241/29; 241/36; 241/76; 241/152 A; 241/275
[58] Field of Search .......... 271/30, 24, 21, 20, 271/275, 34, 36, 76, 77, 78, 29, 152 A

[56] References Cited

U.S. PATENT DOCUMENTS 2,012,694  8/1935  Runyan ................. 241/275 X
3,568,938  3/1971  Barrot et al. ........... 241/34 X Primary Examiner—Mark Rosenbaum
Attorney, Agent, or Firm—Wegner & Bretschneider

[57] ABSTRACT

In an apparatus and method for producing sand from stone, the stone is first crushed in a centrifugal crusher and then filtered through a screen. The stone retained on the screen is further crushed by a vibration mill. The stone passing through the screen and the stone crushed by the vibration mill are combined and then are filtered through a separater to separate out the minute particles. Measurements of various flow rates and particle sizes are made in order to control the rotational speed of the vibration mill and the rate at which stone is supplied to the screen.

7 Claims, 3 Drawing Figures

CRUSHED STONE

SAND PRODUCING METHOD AND APPARATUS

FIELD OF THE INVENTION AND RELATED ART STATEMENT

The present invention relates to a method for producing sand having a predetermined granular size by crushing stone and to an apparatus used in the method.

Due to a recent deficiency of natural sands such as river sand, sea sand, mountain sand and the like to be used as fine aggregates, there is a trend that demands for sand obtained by crushing rock or stone are increased.

In general, a rod mill has been used to obtain the sand, and the sand of the predetermined size has been obtained by adjusting the feed rate of the material to be crushed, a water feed rate, and a rod numbers contained in the rod mill. A rapid adjustment of such parameters is required to obtain the sand having a predetermined granular size.

This adjustment requires a great deal of experience and skill of an operator. Furthermore, there is danger in making the adjustments, since the operator must handle rods having a heavy weight while temporarily stopping the operation of the rod mill. Thus, the adjustment operation is difficult to carry out and is low in productivity.

OBJECT AND SUMMARY OF THE INVENTION

It is an object of the present invention to provide a method for producing with ease sand having predetermined granular size, without the aforementioned skillful and difficult adjustment work, and an apparatus therefore.

The present invention relates to a method and an apparatus for producing crushed sand having a predetermined granular size, wherein the steps of crushing through a centrifugal crusher stone which is the material of the sand, screening the crushed stone and crushing the rough stone obtained over the screen, and removing minute particles from a mixture of crushed stone obtained by the vibration mill and by passing through a screen. The present invention also relates to a sand producing method and an apparatus therefore in which inputted into a computer in a control board are respective fines modulus of the roughly crushed material crushed by the centrifugal crusher, the material on the screen to be fed into the vibration mill and material from which the minute particle are removed, respective weights of the material on the screen and below the screen, a volume ratio and a predetermined granular size of the sand. Such inputted values are judged by the computer to output a suitable signal, thereby controlling a rotational speed of the vibration mill and the feed rate of the material to the screen.

DETAILED DESCRIPTION OF THE PREFERRED EMBODIMENTS

Figure 1:
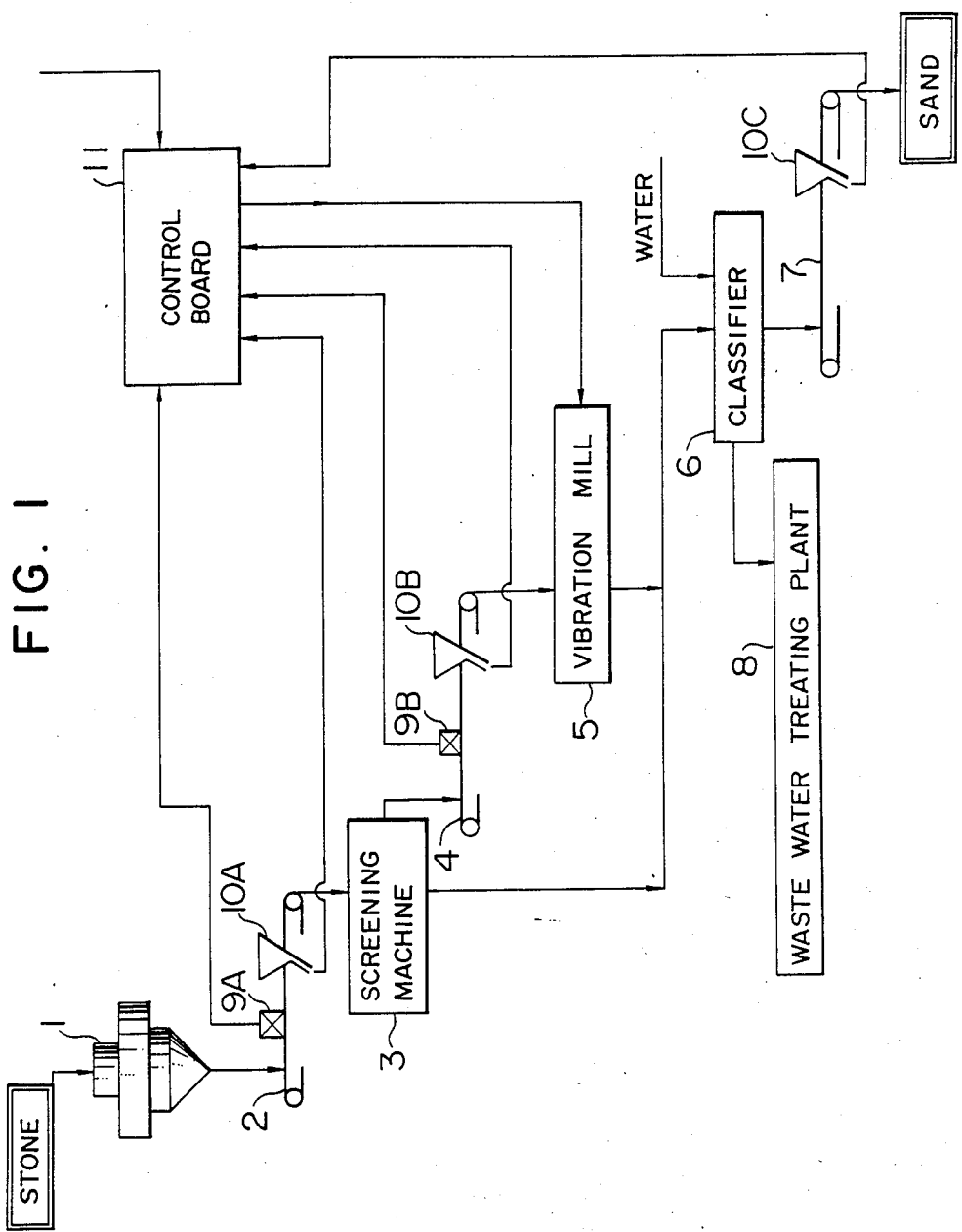
FIG. 1 is systematic view showing one embodiment of the present invention.

A preferred embodiment of the invention will now be described in detail with reference to the accompanying drawings. FIG. 1 shows a method and apparatus according to the present invention for producing sand in the case of removing minute particles from crushed stone in a wet condition. Stone which is the material of sand is fed from an upper portion of a centrifugal crusher 1. The crushed stone is picked up from a lower portion of the centrifugal crusher 1 and is delivered by a belt conveyor 2 to a continuous screen 3 to be screened. The rough lumps of stone on the screen are again fed into a vibration mill 5 by a belt conveyor 4 and further crushed into fine granules. The fine granules are mixed with the crushed stone which has been screened through the continuous screen 3. The mixture of the crushed stone contains very fine particles, therefore, the mixture is introduced into a classifier 6. In the classifier 6, the mixture of the crushed stone is mixed with water fed therein and the granules of the crushed stone having a relative rough size is scraped upwardly by a inclined screw rotating in the classifier 6, so that moisture contained therein is reduced as much as possible and the granules are conveyed by a belt conveyor 7 for storage and become a final product, i.e. sand. The minute particles contained in the crushed stone are discharged from the classifier 6 in a contaminated state mixed with water and are processed by a waste water treating plant 8. The aforementioned method involved the classifier 6 using water. The produced sand contains water and the waste water treating plant is costly. Also, the separation of the minute particles contained in the waste water and the treatment thereof require a relative large number of steps. Therefore, it is possible to use a dry type system as shown in FIG. 2.

Figure 2:
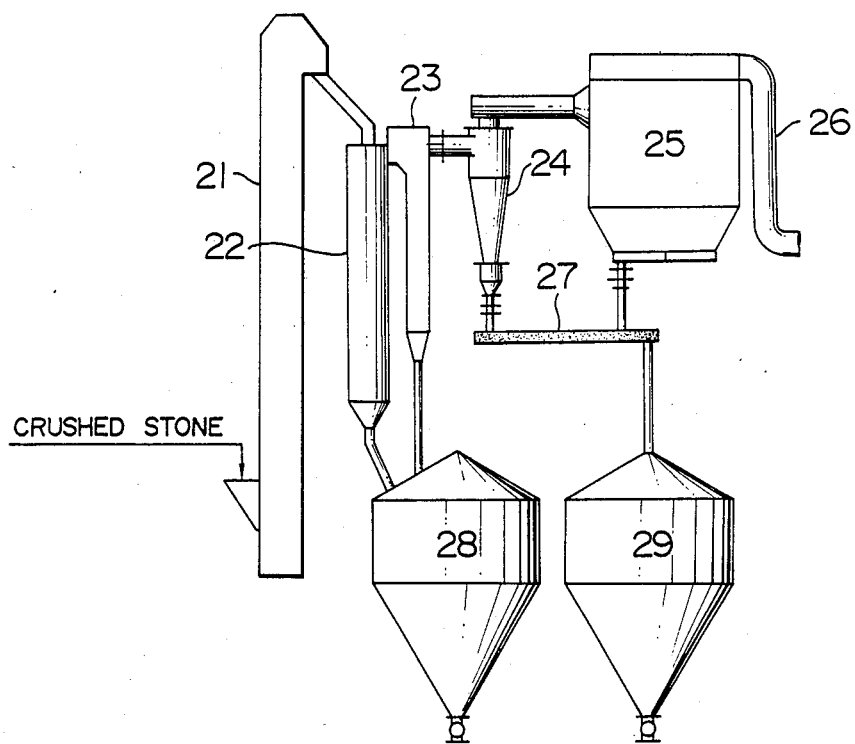
FIG. 2 is a view showing an apparatus for separating a mixture into sand and minute particles in a dry condition in the final step of the present invention.

The crushed stone screened by the continuous screen 3 and discharged from the vibration mill 5 in FIG. 1 are raised to a higher level by a bucket elevator 21 or the like shown in FIG. 2 and are fed into a louver 22 shown in FIG. 2 where the stone is classified into sand and minute particles by air flows. The sand falls through the louver 22 and is stored in a sand tank 28. The air flow containing the minute particles is introduced into a preduster 23 where the rough particles entrained in the air flow are removed. Then, the air is introduced into a cyclone 24 and is discharged to the outside through a bag-filter 25 and a pipe 26. The rough particles separated from the air flow in the preduster 23 fall into the sand tank 28 whereas the minute particles separated in the cyclone 24 and the bag filter 25 are collected into a filler tank 29 by a conveyor 27.

Figure 3:
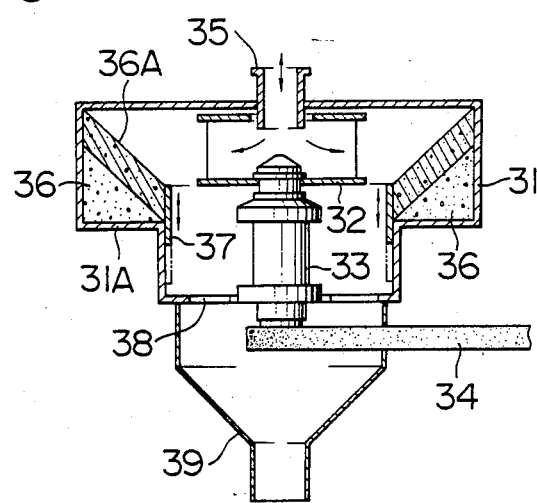
FIG. 3 is a view of a centrifugal crusher used in the embodiment of the invention.

FIG. 3 shows a detail of a structure of the centrifugal crusher 1 in FIG. 1. A rotor 32 fixed to a bearing 33 is rotated high speed around a center axis of the casing 31 of the crusher 1 by a belt 34 driven by an external motor (not shown). The stone fed from a supply port 35 fixed to the upper side of the casing in the central portion of the upper side of the rotor 32 is thrown by a centrifugal force caused by the rotation of the rotor 32 and collides against the crushed stone 36 accumulating on horizontal bottom 31A of the casing to be crushed and accumulated thereon. The crushed stone is fed out by displacing a control plate 37 downwardly or discharging the stone through holes formed in the bottom 31A.

The vibration mill shown in FIG. 1 is of the well known type generally used as a super minute particle crusher and is such that a shaft to which an unbalance weight is fixed is rotated at a high speed so that a crushing body as a whole is vibrated at a high speed whereby rods incorporated in the crushing body impart collision, frictional crushing action and shearing action to the material to thereby crush the material.

The aforementioned method and apparatus according to the invention are controlled by a computer control box to obtain sand having a predetermined granular size. The method and apparatus according to the invention are characterized by the following system.

The respective weights of the material to be fed to the continuous screen 3 and the material to be fed to the vibration mill 5 are measured by scales 9A and 9B provided to the conveyors. Also, these materials on the conveyors and the product on the conveyor 7 are picked up by samplers 10A, 10B and 10C respectively, to thereby measure the fineness modulus. These measured values are inputted into the control board 11 and are judged by a computer belonging to the control board 11. Based upon the judgement, suitable control signals are fed from the control board 11 to drive control sections of the belt conveyor 2 and the vibration mill 5, respectively, to thereby adjust the material feed rate to the continuous screen 3 and the rotational speed of the vibration mill 5.

The adjustment will be undermentioned in great detail. Assuming that F is the fineness modulus of the material crushed by the vibration mill 5 and $F_1$ is the fineness modulus of the material at which the vibration mill is driven to meet a predetermined fineness modulus. When $F > F_1$, the drive motor of the vibration mill is accelerated and inversely when $F < F_1$, the vibration mill is adjusted to be decelerated.

The amount of the material to be fed to the vibration mill 5 is set to be a constant amount $Q_1$. Assuming that Q is the amount of the material fed to the screen 3 and x is the ratio of the amount $Q_1$ of the material on the screen to the amount Q. Such adjustment is carried out so that the amount Q of the material fed to the continuous screen 3 is increased when $x = Q_1/Q$ is greater than a predetermined value, and the amount Q of material fed to the continuous screen 3 is conversely decreased when x is smaller than said value. In view of the case where the material is changed or the screening effect is not sufficiently attained due to clogging of the continuous screen, the weight ratio between the material on and below the screen is inputted into the computer. An error signal is generated in advance in the case where there is a fear that the sand to be a product would have a granular size becoming out of an allowable range of the predetermined granular size on the basis of the ratio. When the error signal is generated, the materials are newly sampled by the samplers to input into the computer the fineness modulus of the respective materials and the weight ratio between the materials on and below the screen. Thus, the rotational speed of the vibration mill 5 and the amount of the material to the continuous screen 3 by the belt conveyor 2 are controlled. The apparatus is, however, continuously driven without being stopped during above operations.

According to the present invention, it is possible to continuously product having a desired granular size in safety by means of the computer of the control board.

Furthermore, it is possible to obtain an extremely low cost and high quality product as a whole, since a part of the material is fed to the vibration mill which is expensive like the rod mill but almost all of the material is crushed by the centrifugal crusher which is of low cost both for the machine and for the running costs.

I claim:

1. A sand producing apparatus comprising:

a centrifugal crusher for crushing an incoming supply of stone, a screening means for dividing the stone that exits the centrifugal crusher into a first stream of stone having a first fineness modulus and a second stream of stone having a second fineness modulus, with said second fineness modulus being smaller than said first fineness modulus, a vibration mill for milling the first stream of stone, with the stone that exits the vibration mill constituting a third stream of stone, a combining means for combining the third stream of stone with the second stream of stone into a fourth stream of stone, a separating means for dividing the fourth stream into a fifth stream of stone having a third fineness modulus and a sixth stream of stone having a fourth fineness modulus, with said third fineness modulus being smaller than said fourth fineness modulus, a first measuring means for measuring the flow rate of the stone that exits the centrifugal crusher, a second measuring means for measuring the flow rate of the first stream of stone, a first sampler for measuring the fineness modulus of the stone that exits the centrifugal crusher, a second sampler for measuring the fineness modulus of the first stream of stone, a third sampler for measuring the fineness modulus of the sixth stream of stone, and a comparator means for comparing the measured values determined by the first and second measuring means and the first, second and third samplers to predetermined measured values to thereby control the flow rate of stone that exits the centrifugal crusher and the rotational speed of the vibration mill.

2. A sand producing apparatus according to claim 1, wherein said centrifugal crusher has such a structure that the stone crushed within said centrifugal crusher is thrown by a rotor rotating at high speed within said centrifugal crusher, and collides against the crushed stone accumulated within said centrifugal crusher to be further crushed.

3. The sand producing apparatus of claim 1 wherein the separating means comprises a classifier to which water is added to cause separation of the fifth stream of stone from the sixth stream of stone.

4. A sand producing apparatus according to claim 3, wherein said centrifugal crusher has such a structure that the stone crushed within said centrifugal crusher is thrown by a rotor rotating at high speed within said centrifugal crusher, and collides against the crushed stone accumulated within said centrifugal crusher to be further crushed.

5. The sand producing apparatus of claim 1 wherein the separating means comprises a dry system having a louver and a preduster for separating the fifth stream of stone from the sixth stream of stone.

6. A sand producing apparatus according to claim 5, wherein said centrifugal crusher has such a structure that the stone crushed within said centrifugal crusher is thrown by a rotor rotating at high speed within said centrifugal crusher, and collides against the crushed stone accumulated within said centrifugal crusher to be further crushed.

7. A method for producing sand comprising:

crushing an incoming supply of stone in a centrifugal crusher, dividing the stone that exits the centrifugal crusher into a first stream of stone having a first fineness modulus and a second stream of stone having a second fineness modulus, with the second fineness modulus being smaller than the first fineness modulus, milling the first stream of a stone in a vibration mill, with the milled stone constituting a third stream of stone, combining the third stream of stone with the second stream of stone into a fourth stream of stone, separating the fourth stream of stone into a fifth stream of stone having a third fineness modulus and a sixth stream of stone having a fourth fineness modulus, with said third fineness modulus being smaller than said fourth fineness modulus, measuring the flow rate of the stone that exits the centrifugal crusher, measuring the flow rate of the first stream of stone, measuring the fineness modulus of the stone that exits the centrifugal crusher, measuring the fineness modulus of the first stream of stone, measuring the fineness modulus of the sixth stream of stone, comparing the measured values of the flow rate of the stone that exits the centrifugal crusher, the flow rate of the first stream of stone, the fineness modulus of the stone that exits the centrifugal crusher, the fineness modulus of the first stream of stone and the fineness modulus of the sixth stream of stone to predetermined values, and adjusting the flow rate of stone that exits the centrifugal crusher and the rotational speed of the vibration mill until the measured values approach the predetermined values.

* * * * *